United States Patent
Su

(10) Patent No.: US 9,291,639 B2
(45) Date of Patent: Mar. 22, 2016

(54) DUAL-PROBE SCANNING PROBE MICROSCOPE

(71) Applicant: Bruker Nano, Inc., Santa Barbara, CA (US)

(72) Inventor: Chanmin Su, Ventura, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 14/215,903

(22) Filed: Mar. 17, 2014

(65) Prior Publication Data

US 2014/0283228 A1 Sep. 18, 2014

Related U.S. Application Data

(60) Provisional application No. 61/801,705, filed on Mar. 15, 2013.

(51) Int. Cl.
| | |
|---|---|
| *G01Q 10/00* | (2010.01) |
| *B82Y 35/00* | (2011.01) |
| *G01Q 10/06* | (2010.01) |
| *G01Q 70/06* | (2010.01) |

(52) U.S. Cl.
CPC ............... *G01Q 10/00* (2013.01); *B82Y 35/00* (2013.01); *G01Q 10/065* (2013.01); *G01Q 70/06* (2013.01)

(58) Field of Classification Search
CPC ....... G01Q 70/06; G01Q 10/65; G01Q 10/00; G01Q 60/24; G01Q 60/34; G01Q 60/36; G01Q 60/363; G01Q 60/02; G01Q 10/065; B82Y 35/00
USPC ........................................ 850/1, 3, 22, 33, 55
See application file for complete search history.

(56) References Cited

U.S. PATENT DOCUMENTS

| | | | |
|---|---|---|---|
| 5,266,801 A | 11/1993 | Elings et al. | |
| RE34,489 E | 12/1993 | Hansma et al. | |
| 5,308,974 A * | 5/1994 | Elings | B82Y 35/00 250/234 |
| 5,412,980 A | 5/1995 | Elings et al. | |
| 5,908,981 A | 6/1999 | Atalar et al. | |
| 5,929,643 A * | 7/1999 | Sakai | B82Y 35/00 324/754.26 |
| 6,028,305 A * | 2/2000 | Minne | B82Y 35/00 250/234 |
| 6,196,061 B1 | 3/2001 | Adderton et al. | |
| 6,279,389 B1 * | 8/2001 | Adderton | B82Y 35/00 73/105 |
| 6,545,492 B1 * | 4/2003 | Altmann | B82Y 35/00 850/3 |
| 7,098,678 B2 * | 8/2006 | Altmann | B82Y 35/00 850/2 |
| 7,312,619 B2 * | 12/2007 | Altmann | B82Y 35/00 850/1 |
| 7,597,717 B1 * | 10/2009 | Lu | B82Y 35/00 850/21 |
| 8,381,311 B2 * | 2/2013 | Jahnke | G01Q 70/06 850/1 |
| 8,769,709 B2 * | 7/2014 | Baur | B82Y 35/00 850/1 |
| 2005/0040836 A1 * | 2/2005 | Altmann | B82Y 35/00 850/8 |
| 2005/0184746 A1 * | 8/2005 | Altmann | B82Y 35/00 850/2 |

(Continued)

FOREIGN PATENT DOCUMENTS

| | | |
|---|---|---|
| EP | 1189240 | 1/2008 |
| JP | H04330653 | 11/1992 |

*Primary Examiner* — Wyatt Stoffa
(74) *Attorney, Agent, or Firm* — Boyle Fredrickson S.C.

(57) ABSTRACT

An apparatus and method of positioning a probe of an atomic force microscope (AFM) includes using a dual probe configuration in which two probes are fabricated with a single base, yet operate independently. Feedback control is based on interaction between the reference probe and surface, giving an indication of the location of the surface, with this control being modified based on the difference in tip heights of the two probes to allow the sensing probe to be positioned relative to the sample at a range less than 10 nm.

13 Claims, 12 Drawing Sheets

(56) References Cited

U.S. PATENT DOCUMENTS

2007/0062264 A1* 3/2007 Wang ............... B82Y 10/00
73/105

2009/0151030 A1* 6/2009 Fouchier ............... B82Y 35/00
850/33

* cited by examiner

DUAL-PROBE SCANNING PROBE MICROSCOPE

CROSS-REFERENCE TO RELATED APPLICATIONS

This application claims priority under 35 USC §1.119(e) to U.S. Provisional Patent Application Ser. No. 61/801,705, filed Mar. 15, 2013, entitled Dual-Probe Scanning Probe Microscope. The subject matter of this application is hereby incorporated by reference in its entirety.

BACKGROUND OF THE INVENTION

1. Field of the Invention

The preferred embodiments are directed to probes of probe-based metrology instruments, and more particularly, to controlling tip-sample separation using a probe assembly including two probes adjacent to one another and having different tip heights.

2. Description of Related Art

Scanning probe microscopes (SPMs), such as the atomic force microscope (AFM), are devices which typically employ a probe having a tip and causing the tip to interact with the surface of a sample with appropriate forces to characterize the surface down to atomic dimensions. Generally, the probe is introduced to a surface of a sample, which essentially involves using the probe as a sensor to detect where the sample surface is, based on its interaction with the sample. This interaction allows the AFM to detect changes in the characteristics of the sample. By providing relative scanning movement between the tip and the sample, surface characteristic data can be acquired over a particular region of the sample, and a corresponding map of the sample can be generated.

A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes (for example, a piezoelectric tube actuator). Alternatively, the scanner may be an assembly of multiple separate actuators. Some AFMs separate the scanner into multiple components (for example, an XY scanner that moves the sample and a separate Z-actuator that moves the probe). The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14, but may be formed integrally with the cantilever 15 of probe 14 as part of a self-actuated cantilever/probe.

Often, a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are transmitted to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations, for example.

AFMs may be designed to operate in a variety of modes, including contact mode and oscillating mode. Operation is accomplished by moving either the sample or the probe assembly up and down relatively perpendicularly to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one mode of AFM operation, known as TappingMode™ AFM (TappingMode™ is a trademark of the present assignee), the tip is oscillated at or near a resonant frequency of the associated cantilever of the probe. A feedback loop attempts to keep the amplitude of this oscillation constant to minimize the "tracking force," i.e. the force resulting from tip/sample interaction. Alternative feedback arrangements keep the phase or oscillation frequency constant. As in contact mode, these feedback signals are then collected, stored, and used as data to characterize the sample. Note that "SPM" and the acronyms for the specific types of SPMs, may be used herein to refer to either the microscope apparatus or the associated technique, e.g., "atomic force microscopy." In a recent improvement on the ubiquitous TappingMode™, called Peak Force Tapping® (PFT) Mode, feedback is based on force as measured in each oscillation cycle.

Regardless of their mode of operation, AFMs can obtain resolution down to the atomic level on a wide variety of insulating or conductive surfaces in air, liquid, or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

One challenge when performing AFM is that though the imaging probe is used as a sensor to detect the surface, there are many types of experiments utilizing AFM that would benefit from being able to position the probe at a particular precise distance from the sample surface. Conventionally, the sample surface is identified by bringing the probe into contact with the sample, no matter what mode of AFM operation. Thereafter, the user has an indication of where the surface is. Ideally, knowing the exact location of the surface and being able to detect motion exactly where the tip is relative to the surface would be advantageous. However, given the range at which the tip apex needs to be positioned relative to the sample surface, as little as two nanometers or less, this task has been nearly impossible.

There are systems that employ different types of structures to identify an array of sample properties, but none have been able to achieve precise positioning of the tip-sample separation distance.

In U.S. Pat. No. 5,908,981 to Atalar et al. at Stanford University, a probe having interdigitated fingers capable of sensing different types of sample properties is provided. The issue being addressed by the Atalar et al, patent, however, is greater precision in deflection detection. Several challenges and drawbacks exist with such probes. The probes are difficult to fabricate and resolving the deflection of each finger is complex. Alternate structures, such as interferometer fibers, have been employed in AFM systems to attempt to detect the surface to help position the imaging probe, but all such solutions pose their own problems with respect to complexity, SNR, repeatability, deflection detection and ultimately precise positioning. There is one known system that is able to accurately position the probe relative to the sample. The system is maintained by IBM using a non-standard environment under highly controlled conditions, including maintaining the probe-sample relationship in a controlled environment consisting primarily of helium to minimize the effects of mechanical noise between the probe and sample. Clearly, such a system is impractical for the commercial/industrial/research applications contemplated by the preferred environments.

There was no known commercially viable instrument which was capable of detecting the motion of the imaging probe exactly where the tip is relative to the sample surface. A solution was desired.

SUMMARY OF THE INVENTION

The preferred embodiments are directed to a dual-probe AFM that employs two probe cantilevers on a single base, such as a silicon chip. Importantly, the probe cantilevers, and more particularly, the tips mounted thereto, maintain the same mechanical path between the tips and the sample. One of the probes, the reference probe, employs a longer tip (i.e., greater height) than the other to touch the sample surface first when acquiring AFM data. This reference probe gives an indication of where the sample surface is to the second probe (the sensing or imaging probe). In essence, the reference probe is used to define the sensing probe "Z" position. This arrangement can be used for noise reduction and high-resolution imaging while maintaining the integrity of the sensing probe and eliminating z-drift. As a result, AFM measurements such as non-contact force gradient sensing, near-field optical spectroscopy sensing, as well as other metrology techniques, are enabled.

In accordance with one aspect of the preferred embodiments, an AFM includes a first probe having a tip with a first height, and a second probe including a tip having a second height. A feedback controller instructs an actuator coupled to the first and second probes in response to the deflection of the first probe, with the setpoint associated with the controller modified based on a difference in the heights of the first and second probe tips.

According to another aspect of the preferred embodiments, the first probe and the second probe share a common base.

In another aspect of the preferred embodiments, the first probe has a TappingMode™ AFM resonant frequency, $\omega_1$, that is different than a TappingMode™ AFM resonant frequency, $\omega_2$, of the second probe.

In a further aspect of the preferred embodiments, the first probe is a reference probe operated in a DC AFM Mode, and the second probe is an imaging probe operated in an AC AFM Mode.

According to another aspect of the preferred embodiments, a difference between the first height and the second height is less than about 20 nm.

A method of positioning a probe of an AFM relative to a sample includes providing a probe assembly including two probes, a reference probe having a tip with a height, $h_1$, and an imaging probe having a tip with a height, $h_2$. Then, a surface of the sample is detected using the reference probe. The method then tracks the surface based on the detecting step using a feedback controller having a setpoint, and changes the setpoint based on a difference between $h_1$ and $h_2$ to position the imaging probe tip relative to the sample.

In another aspect of this embodiment, the changing step includes positioning at least one of the probe and the sample so that the tip-sample separation is less than 20 nm, without the tip ever touching the sample surface.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

In the preferred embodiments, a dual-probe AFM is able to detect motion at a particular location by always knowing where the tip is. To do so, the surface motion detector (reference probe) has effectively the same mechanical path as the imaging tip (imaging probe). Ideally, for the applications contemplated by the present preferred embodiments, subnanometer Z-resolution is the goal. Note that though the same mechanical path is maintained between the two probes of the dual-probe probe assembly, reference sensing and image sensing are completely independent so that the AFM is able to successfully position the image sensing probe.

Figure 2:
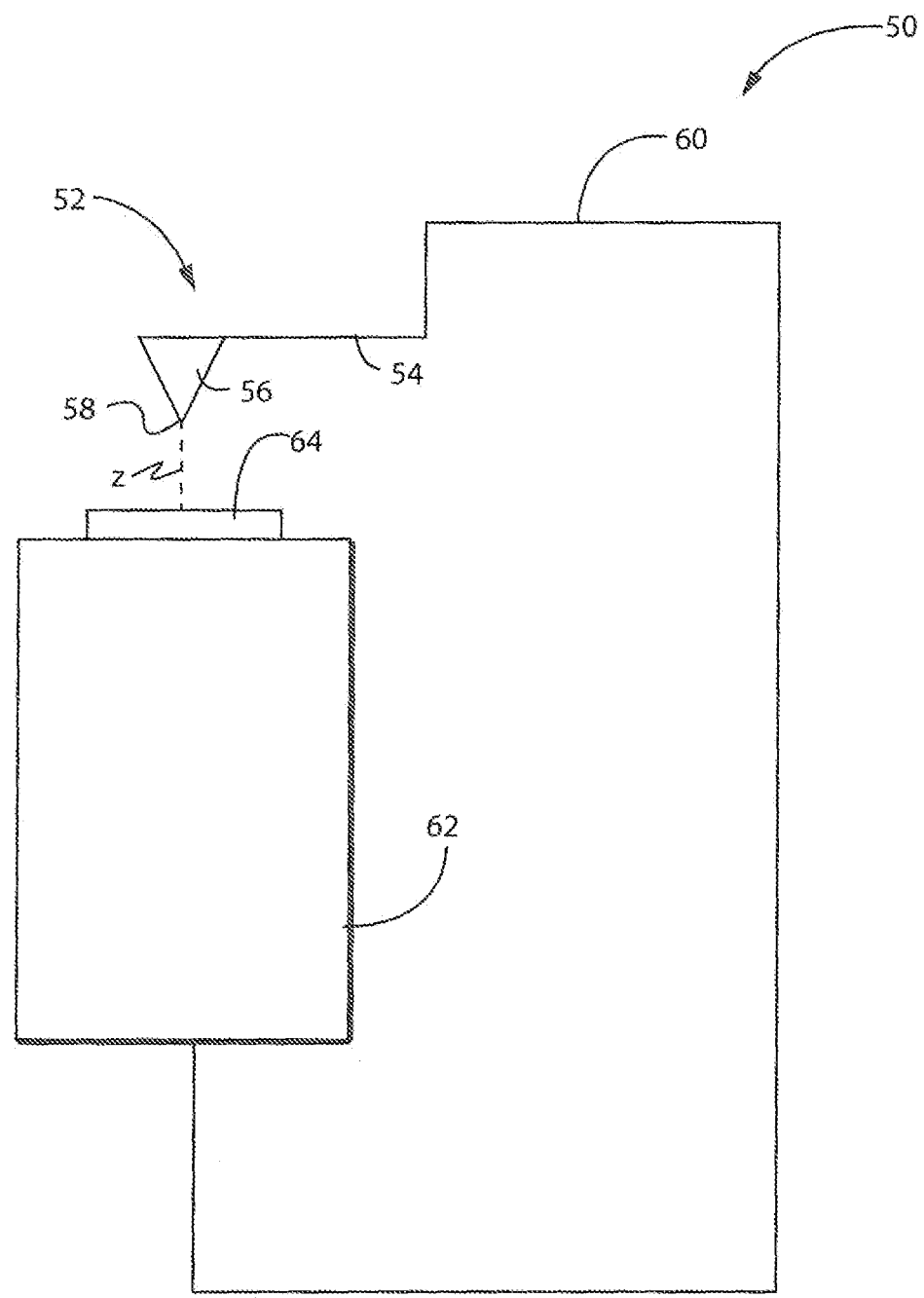
FIG. 2 is a simplified schematic illustration of the mechanical path between the AFM probe and the sample, the distance "Z" between the two being modulated during AFM operation.

Force sensing on a small scale (10-100 pN) is desired with positioning capability on the scale of 0.1 nanometer (1 Angstrom). With such small scale forces being detected, the mechanical path and the associated noise pose a challenge to all AFM users attempting to obtain reliable sample data. In FIG. 2, a high level schematic of the physical relationship between a probe 52 and a sample 64 in an AFM 50 is shown. There is a large opportunity for mechanical resonances to interfere with obtaining good, quality AFM data. The shortest possible mechanical path has been a concern of all AFM manufacturers.

Figure 3:
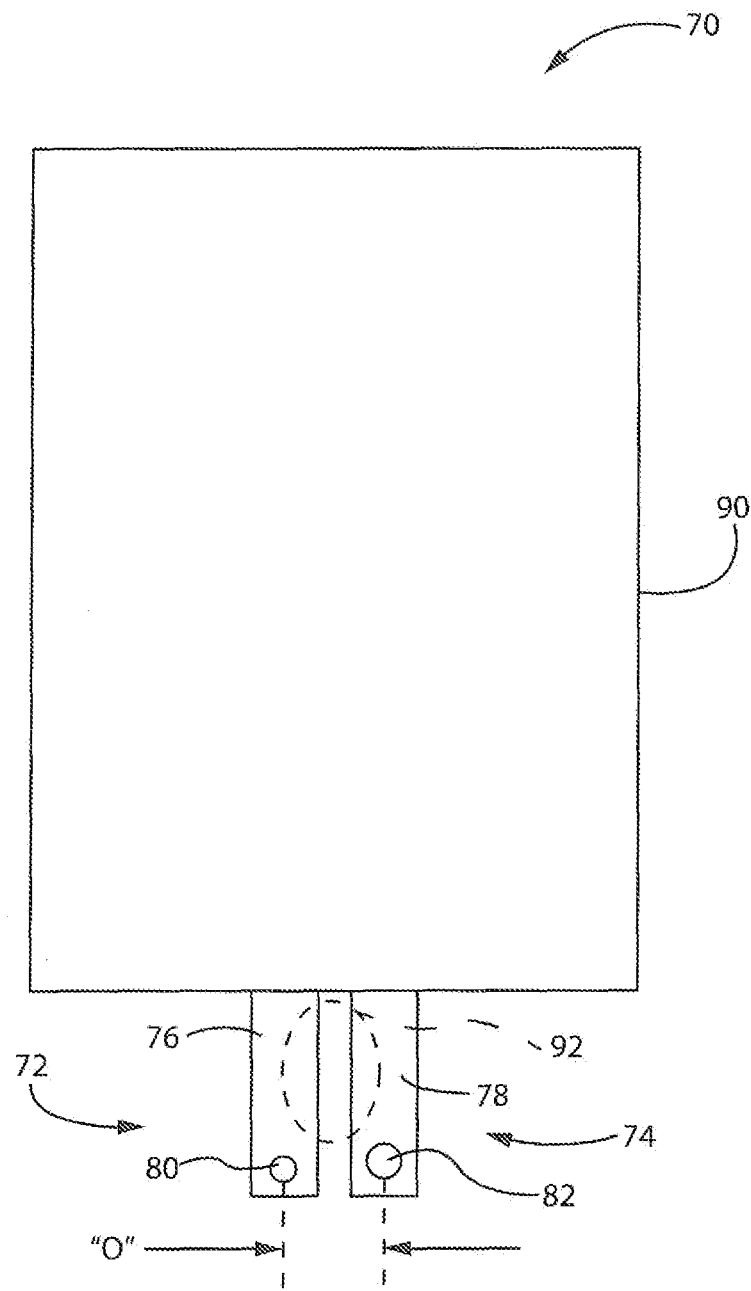
FIG. 3 is a schematic top view of a dual-probe probe assembly, according to a preferred embodiment.
Figure 4:
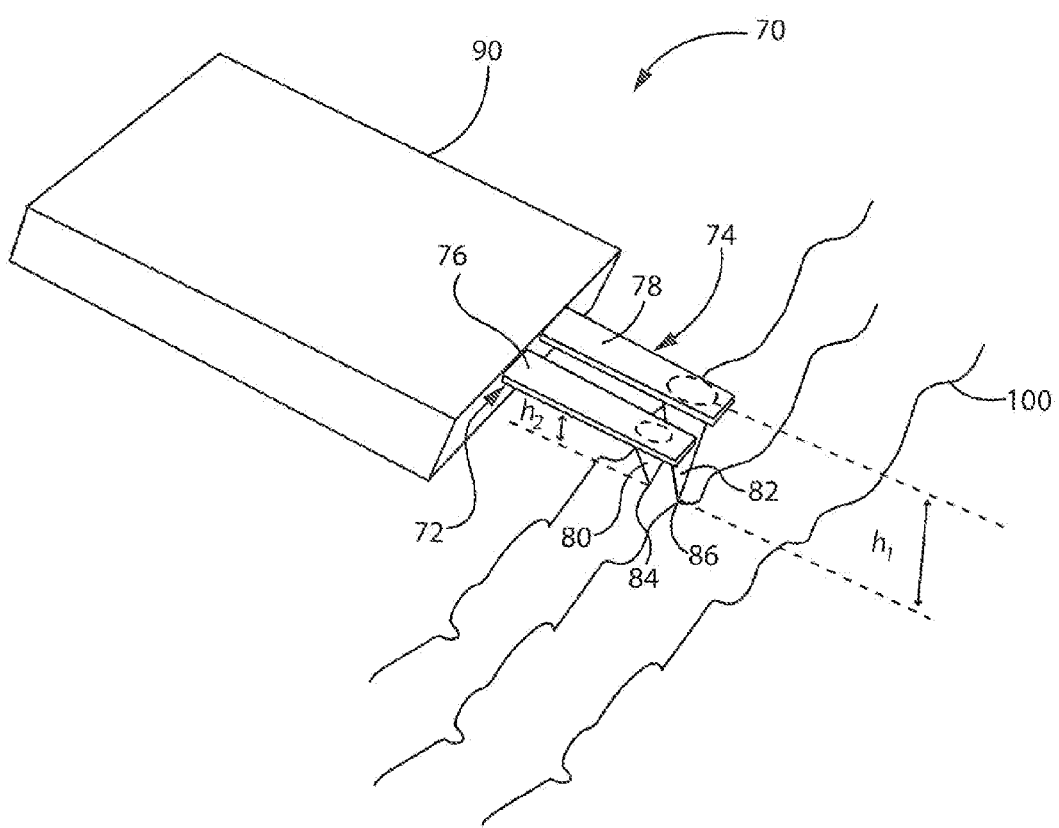
FIG. 4 is a schematic isometric view of the dual-probe probe assembly of FIG. 3.

The focus of the preferred embodiments has been on probe design. Turning to FIGS. 3 and 4, in order to achieve the noise reduction desired, the preferred embodiments employ a probe assembly 70 having dual-probes 72, 74, each probe having a cantilever 76, 78 and a tip 80, 82, respectively. More particularly, cantilever 78 of reference probe 74 supports tip 82 which has a first height ($h_1$ see FIG. 4) which is used to detect where the sample surface is prior to the imaging probe 72 contacting the surface. Second or imaging probe 72 includes a similar cantilever 76 (length, spring constant) but with a tip extending from its distal end that is shorter (height, $h_2$, see FIG. 4). As a result, reference probe 74 always contacts the sample surface first. Importantly, though they operate independently, probes 72, 74, extend from a common base 90, which itself is moved by the Z-acutator of the control loop, to maintain a common mechanical path.

Figure 1:
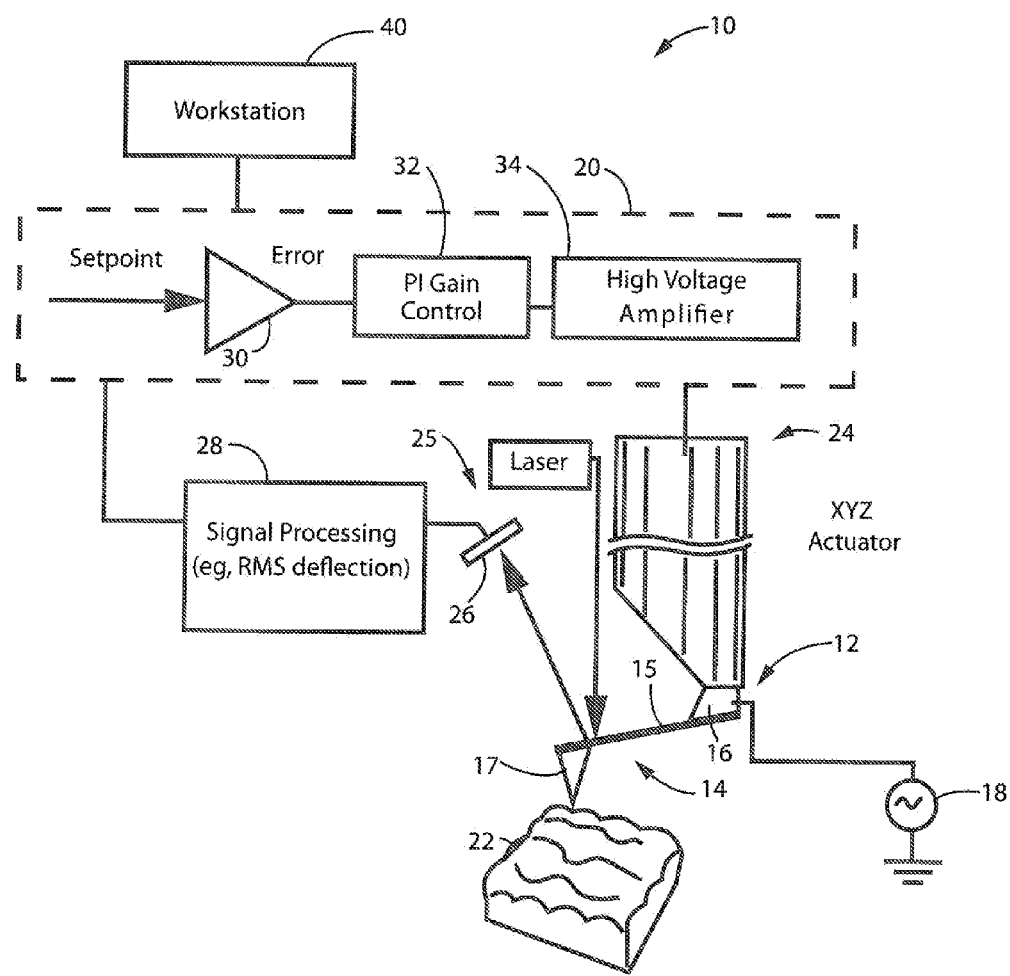
FIG. 1 is a schematic illustration of a Prior Art atomic force microscope (AFM)

With further reference to FIG. 3, a laser spot 92 is shown on the dual-probe configuration to detect motion of each of probes 72, 74. The feedback system (such as that shown in FIG. 1) can differentiate the two probes 72, 74 by the tapping resonance associated with each probe (as long as they are not equal), or operating the reference probe 74 in a different mode such as in contact mode AFM.

Turning more specifically to FIG. 4, dual-probe probe assembly 70 is shown in operation imaging a sample 100. The probe-sample separation is narrowed until reference probe apex 86 contacts the surface of sample 100, thus providing an indication of where the sample surface is. It is the deflection signal corresponding to deflection of reference probe 74 that is used by the feedback controller to control tip-sample separation and track the sample surface.

As the deflection of reference probe 74 is used to control tip-sample separation, knowledge of the difference in tip heights ($h_1$, $h_2$) between reference probe 74 and sensing imaging probe 72 can be used to modify the setpoint of the feedback controlling probe assembly 70 (which again, uses reference probe deflection as its input). By driving reference probe 74 harder toward the surface of sample 100, for example, by an amount that will allow the sensing probe to touch the surface (or stay above the surface a certain amount), the sensing probe can be precisely positioned relative to the sample surface within a range defined by the difference in tip height ($h_1$, $h_2$) of probes 72, 74. In this way, unlike some prior systems in which multiple probes may be used to sense the surface and then image the surface a second time, these probes will be operated concurrently, not sequentially. If the imaging probe 72 is operated in TappingMode™, the tapping signal associated with probe 72 provides an indication of the surface without using imaging probe feedback.

Referring again to FIG. 3, to minimize the effects of mechanical noise, the linear offset "O" between the two tips 80, 82 is preferably designed to be in a range of about a few hundred nm or less. The offset "O" is selected so that any sensed motion of the probes is due to sample properties and not mechanical noise.

Figure 5:
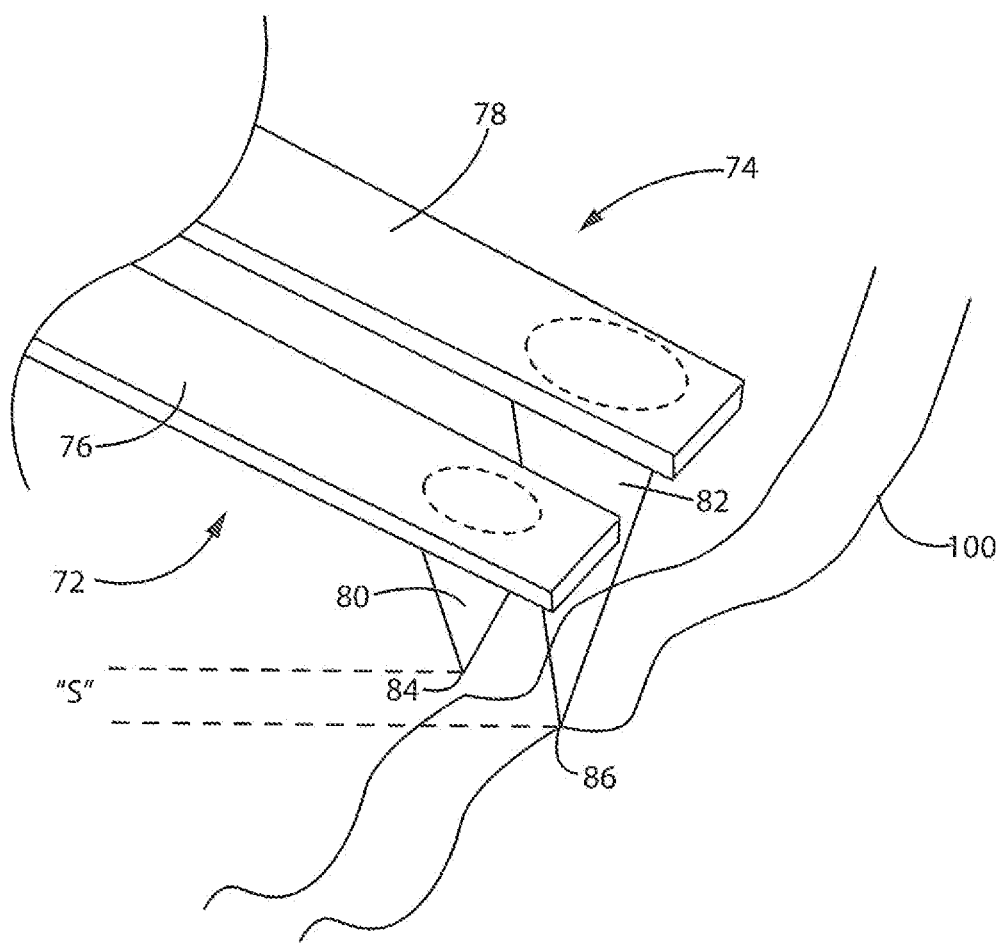
FIG. 5 is a schematic illustration of tip apex to sample distance for each probe of the dual-probe probe assembly.

Turning to FIG. 5, the two probes 72, 74 are scanned across sample surface 100 with the imaging probe 72 having knowledge of a) where the surface is via detected interaction between reference probe 74 and the sample, and b) the difference ("S") in tip heights (approximately 0.5 nm to 100 nm, and preferably less than 20 nm). When reference probe 74 first starts to interact with the surface of sample 100, the user knows that the imaging probe 72 is the difference in tip heights away from the sample.

To differentiate the response detected from each probe, the control/reference and sensing probes can be designed and/or operated to facilitate such differentiation. For instance, the control or reference probe 74 may be operated in a DC mode such as contact mode, while the sensing probe is operated in an AC mode such as TappingMode™. The differences in the output signals provided by the deflection detection scheme (e.g., optical detection shown in FIG. 1) will be readily apparent. Alternatively, reference probe 74 can be operated in one oscillating mode such as a lateral force AFM mode, while the imaging probe could be operated in a vertical or Z oscillating mode, such as TappingMode™. In another alternative, each probe 72, 74 could be operated in the same oscillating mode such as TappingModem™, but designed with different resonant frequencies. Again, in each case, the deflection of each probe of the dual-probe configuration will be apparent.

Figure 6:
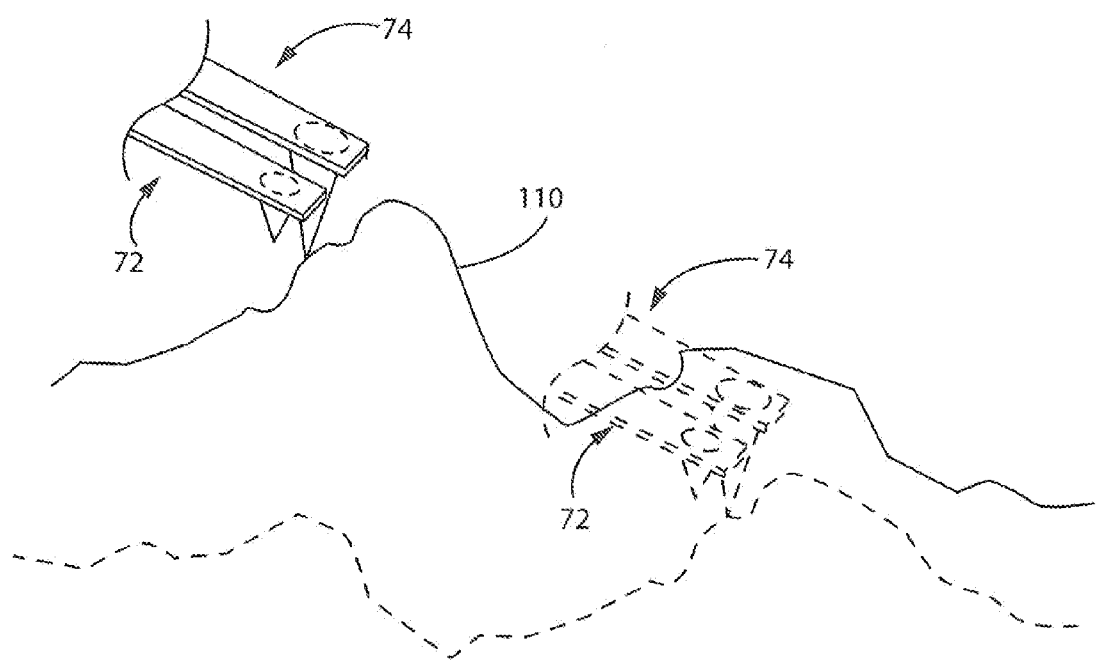
FIG. 6 is a schematic side view of the dual-probe AFM of the preferred embodiments, shown imaging a live cell.

In FIG. 6, a schematic image of a moving surface, such as a live cell, is shown. Prior to the present preferred embodiments, a surface that moves such as this would be nearly impossible to image with an AFM. However, now, with continuous knowledge of where the surface is at, the imaging probe can be positioned to perform all types of measurements, including mechanical property and other sample characteristics on non-static samples.

Figure 7:
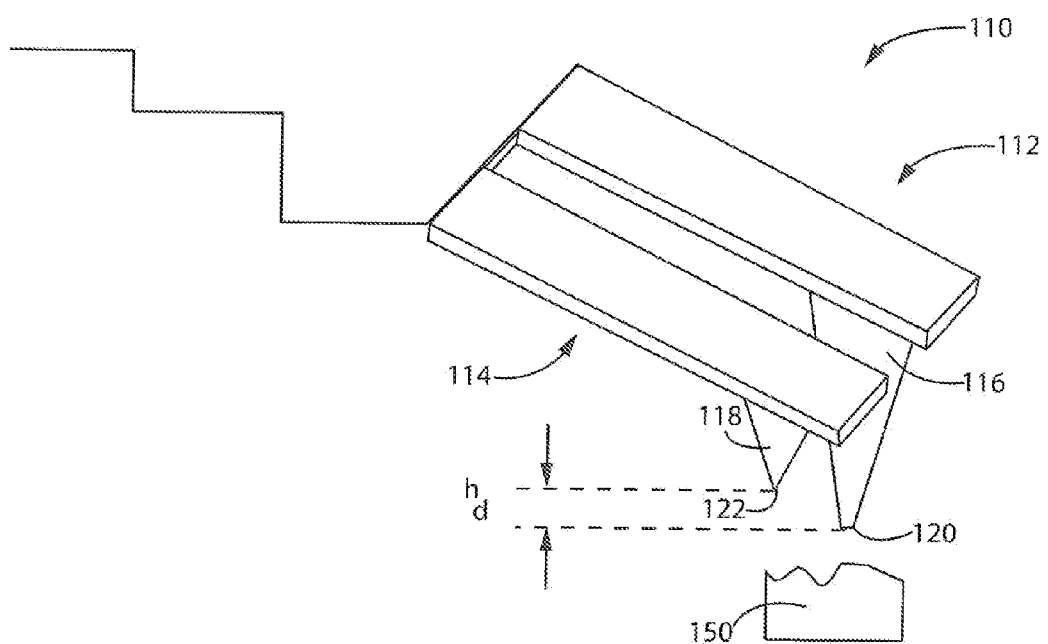
FIG. 7 is a schematic side view of the dual-probe AFM of the preferred embodiments, illustrating a blunt reference tip of the dual-probe assembly, with the imaging tip being sharp
Figure 8:
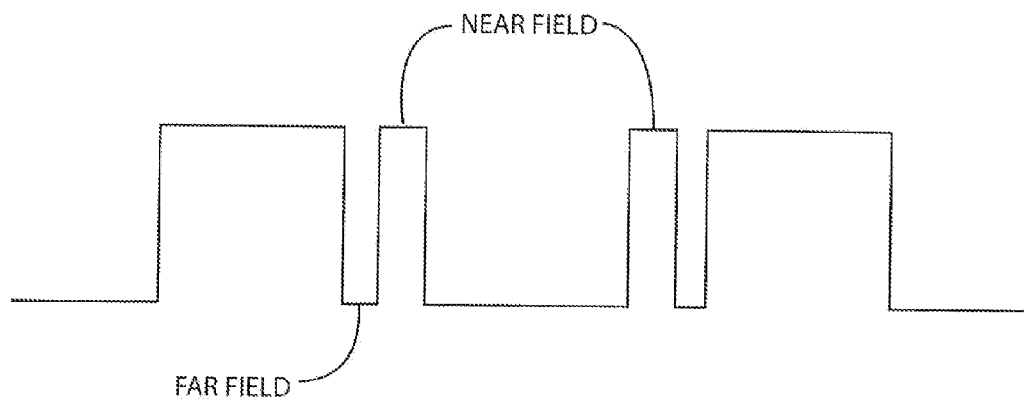
FIG. 8 is a schematic view of the output signal illustrating the near and far-field portions of the response of the instrument shown in FIG. 7.

A schematic AFM dual-probe configuration 110 for a case in which one of the probes is electrically active is shown in FIG. 7. A blunt reference probe 112 may be provided to detect the sample surface; in this dual probe configuration, there is no concern regarding tip wear as all the system cares about is where the sample surface is. Reference probe 112 has a tip 116 having a blunt (e.g. comparatively flat distal end) apex 120, while imaging probe 114 has a sharp tip 118, with a corresponding apex 122. As long as the difference in tip heights, $h_d$, is known, the dual-probe configuration will achieve its goal. In this case, the sensing probe 114 is an electrically active probe, such as that used in AFM-based spectroscopic techniques. Reference probe 112 does not interfere with the electrically active sensing probe 114 because it can be made to be insulated. By maintaining the electrically active probe precisely located relative to the sample surface as described above, large improvements in technologies such as s-SNOM and photo thermal chemical nano-identification can be obtained. As shown schematically in FIG. 8, a strong near-field signal can be detected when performing such measurements and far-field signals associated with such techniques are easy to differentiate when the tip is maintained at a particular Z position relative to the sample surface.

Figure 9:
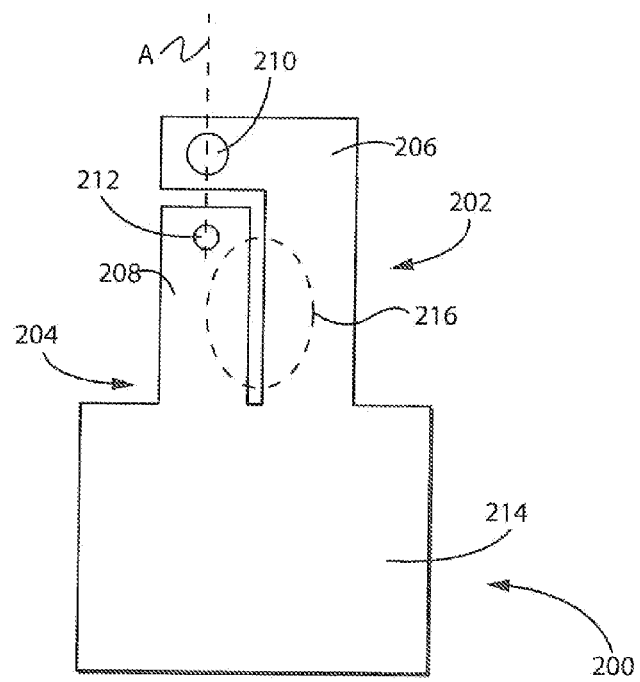
FIG. 9 is a schematic top view of a cantilever arrangement of a dual-probe probe assembly, according to an alternate embodiment.

Turning to FIG. 9, the specific geometry of the individual probes of a dual probe configuration according to the preferred embodiments is not critical. For instance, dual probe configuration 200 includes a reference probe 202 having an L-shaped cantilever 206. Despite the unconventionally shaped lever, a tip 210 of reference probe 202 is aligned along an axis "A" with a tip 208 of imaging probe 204 having a conventional diving-board type cantilever 208. Detection of probe motion is still provided, preferably, using an optical beam-bounce scheme in which a laser beam (spot 216) is reflected off the back of the levers. Operation is as described previously, with reference probe 202 providing an indication of where the sample is before the imaging probe interacts with the surface to gather metrology data.

Figure 10:
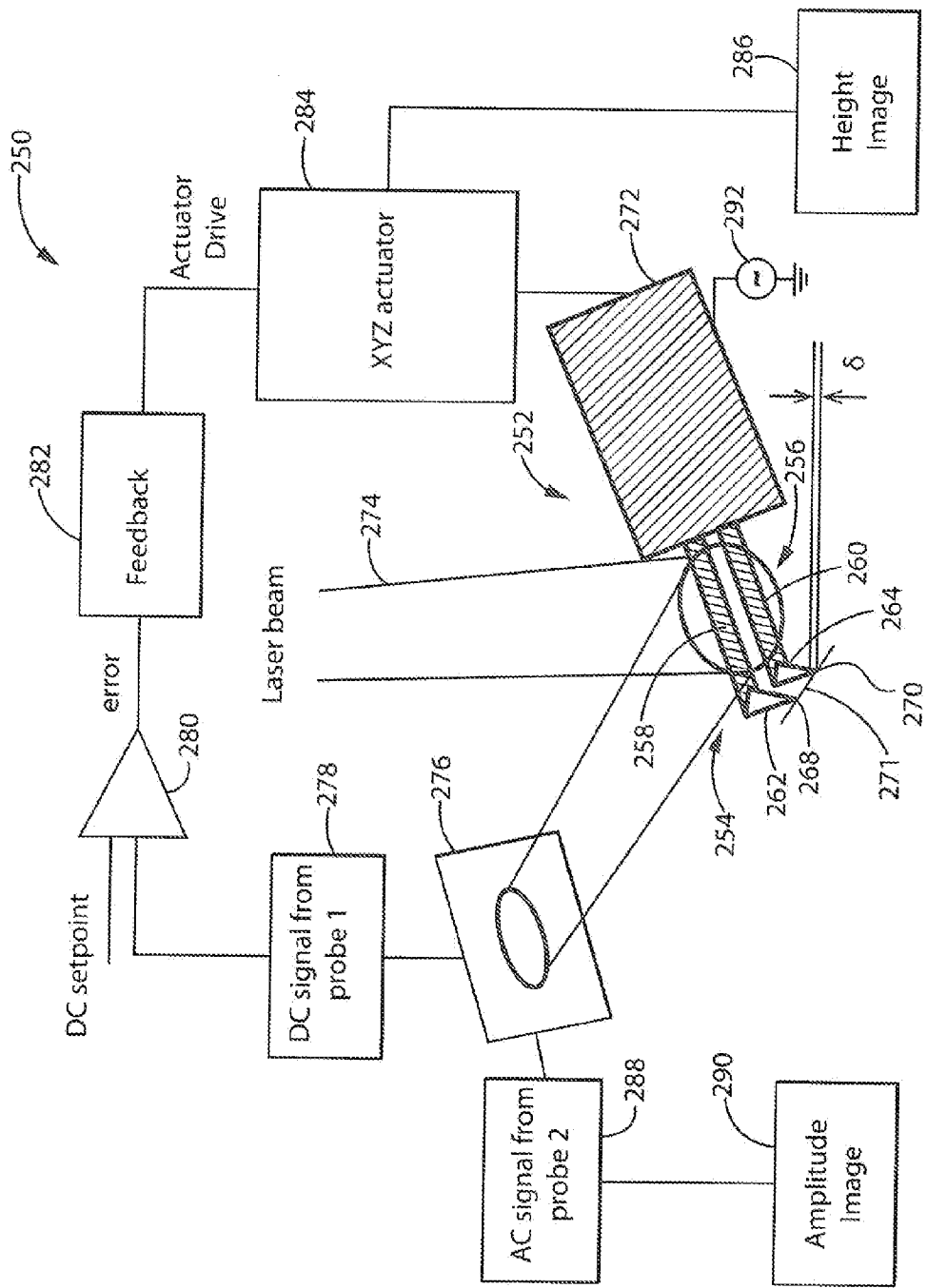
FIG. 10 is a schematic block diagram of a dual probe AFM configuration according to a preferred embodiment, illustrating the imaging probe out of contact with the sample.

A dual probe AFM system and its operation are shown and described in connection with FIGS. 10-12. Turning initially to FIG. 10, a dual probe AFM system 250 includes a dual probe assembly 252 including first and second probes 254, 256 that are the reference probe and the imaging probe, respectively. Probes 254, 256 extend from a common base and may be driven by a source 292 (e.g., in to oscillation in TappingMode™ AFM). Probes 254, 256 include cantilevers 258, 260 supporting tips 262, 264, the tips having a height difference, δ.

In operation, as the tip-sample separation is reduced, an apex 268 of reference probe 254 interacts with a sample 271 first and its deflection is sensed by the optical detection scheme, including a laser beam 274 directed toward the backside of the reflective cantilevers of the probes and directed to photodetector 276. If reference probe is operating in contact mode, a DC deflection signal 278 is output by detector 276 and transmitted to the feedback loop for comparison to the DC setpoint at Block 280. The corresponding error signal is coupled to a feedback gain stage 282 that outputs an appropriate control signal ("actuator drive") to an actuator 284 to maintain tip-sample interaction at the setpoint, in conventional AFM fashion. The control signals in this case are indicative of the topography of sample 271, which is collected at Block 286.

While reference probe 254 interacts with the sample surface, due to the difference in tip height between reference probe 254 and imaging probe 256, and the precise control provided by the feedback system tries to minimize the force at which the reference probe interacts with the surface, the imaging probe resides some amount above the surface, generally corresponding to the difference in tip heights. If the probe is driven by source 292 to oscillate, the corresponding oscillating motion of imaging probe 256 is detected by photodetector 276 and the corresponding AC signal 288 provides an amplitude image (with no tip-sample interaction, free oscillation amplitude).

Figure 11:
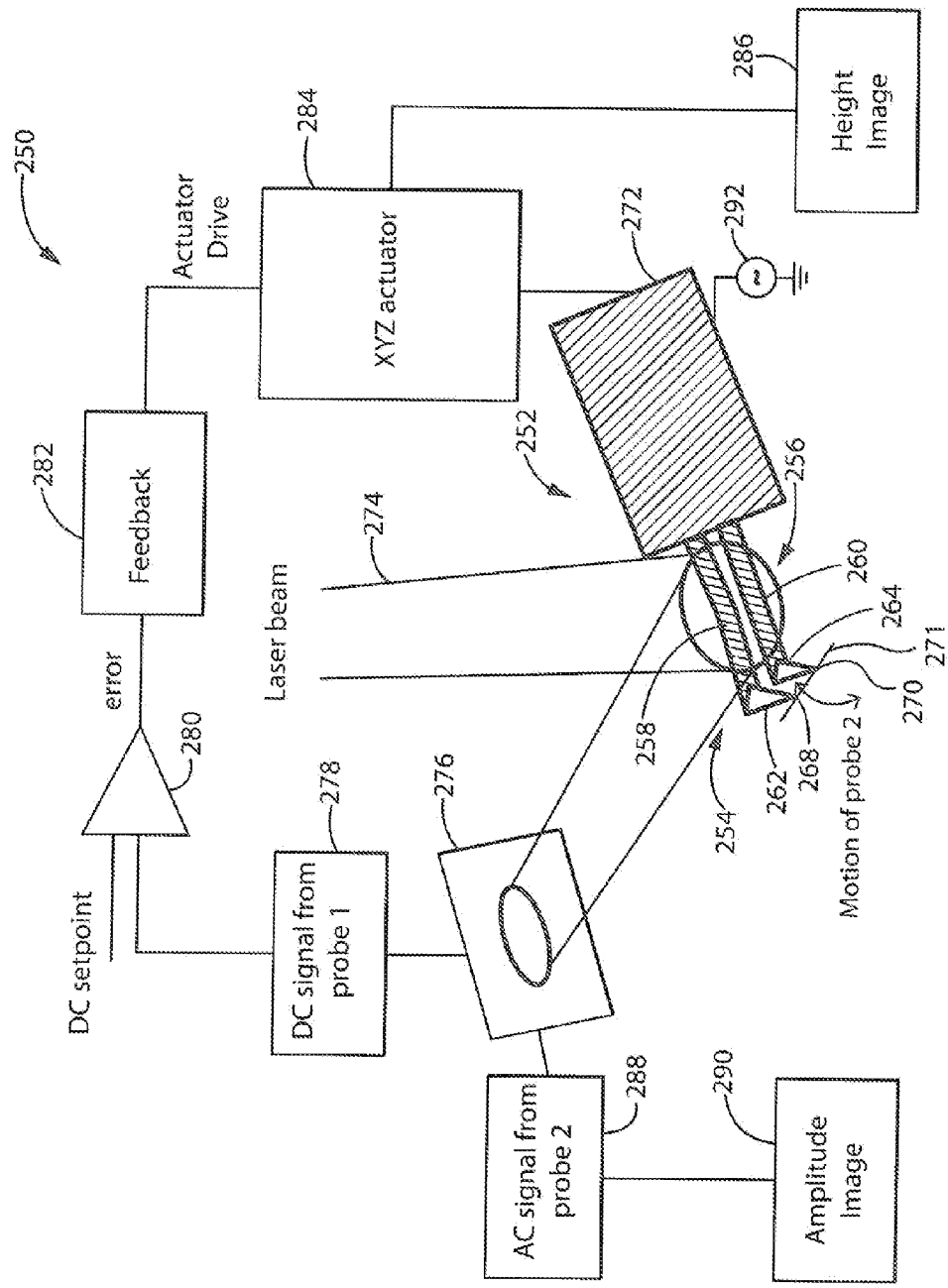
FIG. 11 is a schematic block diagram of a dual probe AFM configuration according to a preferred embodiment, illustrating a change in setpoint causing the imaging probe to interact with the sample.
Figure 12:
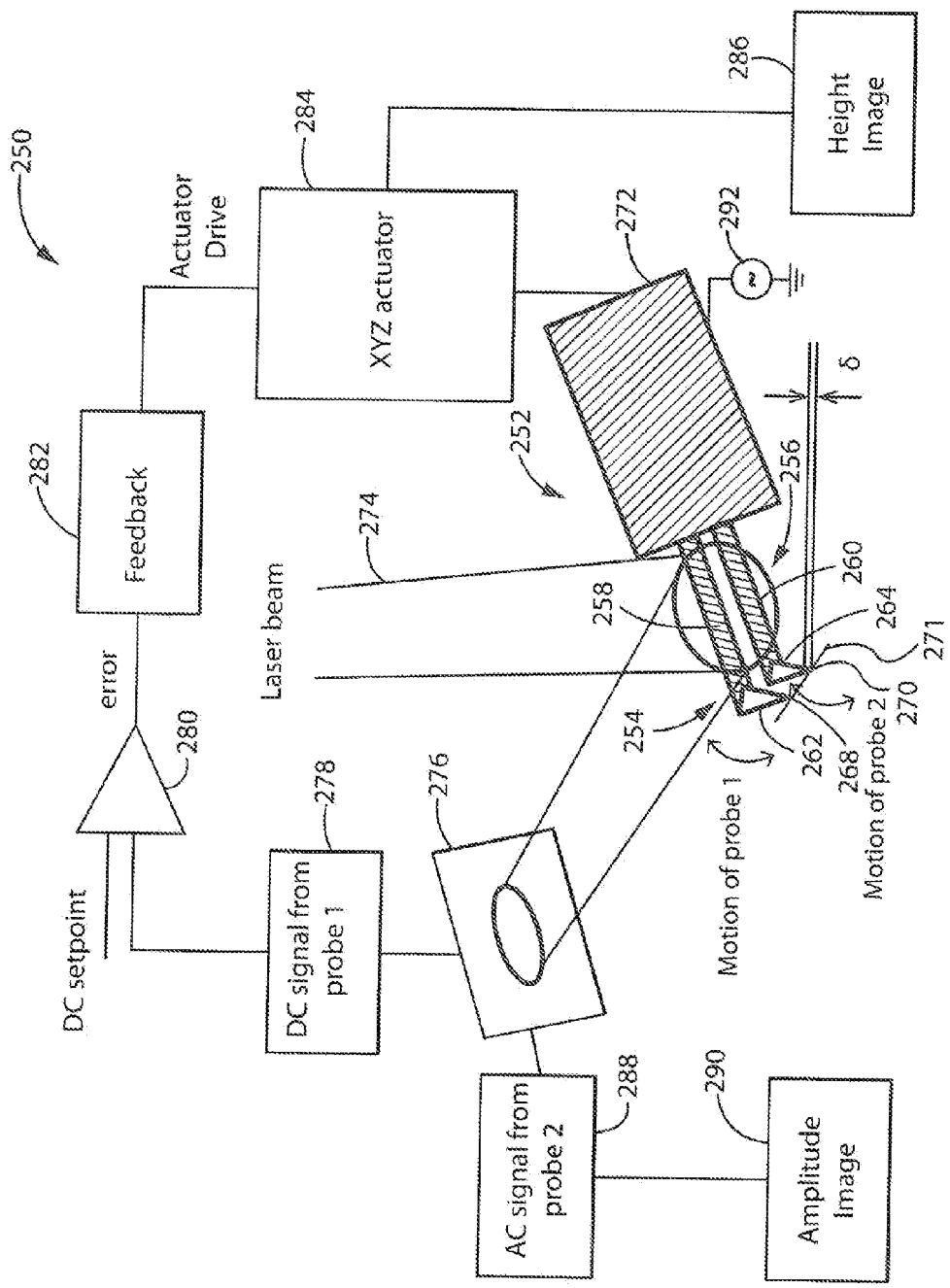
FIG. 12 is a schematic block diagram of a dual probe AFM configuration according to a preferred embodiment, illustrating the imaging probe out of contact with the sample.

Turning to FIG. 11, to cause the imaging probe 256 to interact with the sample, the user adjusts the DC setpoint so the reference tip 262 is driven more in to the sample. Knowing the difference in tip heights, the user knows how much the setpoint needs to be adjusted so that tip 264 of imaging probe 256 interacts with the sample. In this way, with careful selection of the reference probe setpoint, precise control over the position of imaging probe apex 270 can be maintained, as described in further detail above. FIG. 12 illustrates similar operation to that shown in FIGS. 10 and 11, but in this case both reference probe 254 and imaging probe 256 of system 250' are oscillated (for example, in TappingMode™ AFM). Similar to the previously described operation in connection with FIG. 11, the FIG. 12 system requires that the user make a setpoint adjustment (based primarily on the difference in tip heights between the probes), in this case, the TappingMode™ AFM setpoint, to cause the tip imaging probe 256 to interact with the sample.

Figure 13:
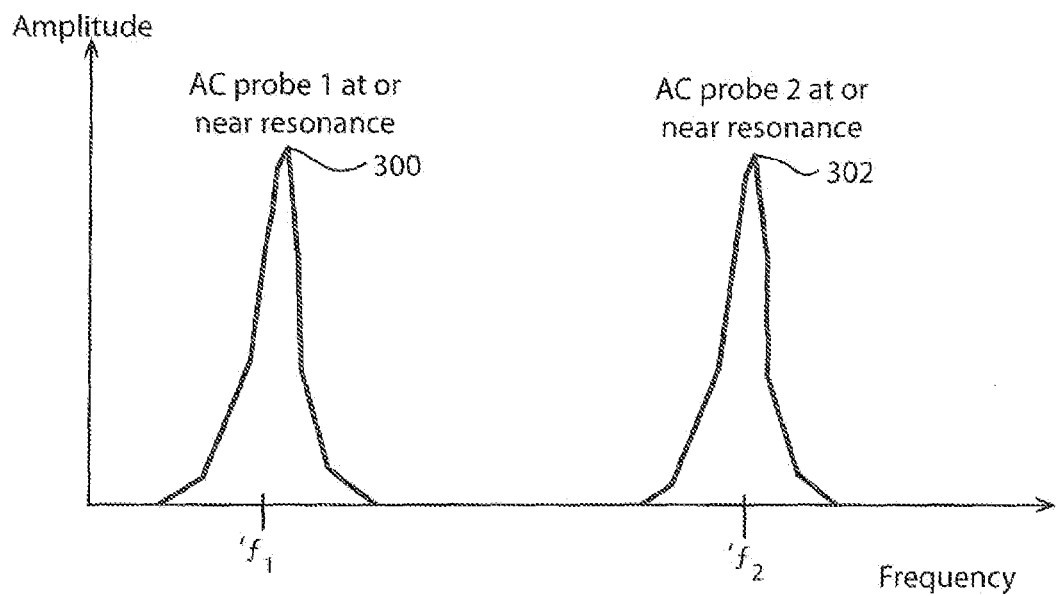
FIG. 13 is a plot of frequency versus amplitude response, illustrating the resonance peaks of each probe of the dual probe configuration of a preferred embodiment.

To discriminate the signals generated by the motion of each probe 254, 256, any of the number of methods described previously may be used. In FIG. 13, an illustration of how the tip-sample interaction of each probe can be distinguished when operating both probes in an oscillating mode such as TappingMode™ is shown. In this case, reference probe 254 has a resonance frequency, $f_1$, which is substantially less than the resonance frequency, $f_2$, of the imaging probe 256. Based on this difference, the AC signals collected in Block 288 can be readily distinguished to identify the tip-sample interaction corresponding to each probe.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A method of positioning a probe of an atomic force microscope (AFM) relative to a sample, the method comprising:

providing a probe assembly including two probes, a reference probe having a tip with a height, $h_1$, and an imaging probe having a tip with a different height, $h_2$, wherein a mechanical path between the reference probe and the sample and the imaging probe and the sample is the same;

detecting a surface of the sample using the reference probe;

tracking the surface based on the detecting step using a feedback controller having a setpoint; and changing the setpoint based on a known difference between $h_1$ and $h_2$ to position the imaging probe tip relative to the sample;

wherein $h_1 > h_2$.

2. The method of claim 1, wherein the two probes share a common base.

3. The method of claim 2, wherein a linear offset between the first tip and the second tip is less than 500 nm.

4. The method of claim 2, wherein the changing step includes positioning at least one of the probes and the sample so that the tip-sample separation is less than 20 nm.

5. The method of claim 4, wherein the tip-sample separation is sub-nanometer.

6. The method of claim 1, wherein the first probe has a Tapping Mode AFM resonant frequency, $\omega_1$, that is different than a Tapping Mode AFM resonant frequency, $\omega_2$, of the second probe.

7. The method of claim 1, wherein the first probe is a reference probe operated in a DC AFM Mode, and the second probe is an imaging probe operated in an AC AFM Mode.

8. A method of positioning a probe of an atomic force microscope (AFM) relative to a sample, the method comprising:
   providing a probe assembly including two probes, a reference probe having a tip with a height, $h_1$, and an imaging probe having a tip with a different height, $h_2$, wherein a mechanical path between the reference probe and the sample and the imaging probe and the sample is the same;
   engaging a surface of the sample with the reference probe;
   scanning the sample with the probe assembly by providing relative scanning motion between the probe assembly and the sample;
   using, during the scanning step, the reference probe in a feedback loop of the AFM to control probe-sample separation of the imaging probe; and
   measuring a property of the imaging probe concurrently with the using step;
   wherein $h_1 > h_2$.

9. The method of claim 8, wherein the property is imaging probe deflection.

10. The method of claim 8, wherein the two probes share a common base and wherein a linear offset between the first tip and the second tip is less than 500 nm.

11. The method of claim 10, wherein the first probe is a reference probe operated in a DC AFM Mode, and the second probe is an imaging probe operated in an AC AFM Mode.

12. The method of claim 8, comprising:
   detecting a surface of the sample using the reference probe;
   tracking the surface based on the detecting step using a feedback controller having a setpoint; and
   changing the setpoint based on a difference between $h_1$ and $h_2$ to position the imaging probe tip relative to the sample.

13. The method of claim 12, wherein the changing step includes positioning at least one of the probes and the sample so that the tip-sample separation is maintained on the sub-nanometer scale.

\* \* \* \* \*